INVENTORS
ARTHUR I. STOLLER &
IRWIN GORDON
BY J. L. Whittaker
ATTORNEY

INVENTORS
ARTHUR I. STOLLER &
IRWIN GORDON
BY
J. L. Whittaker
ATTORNEY

United States Patent Office 3,047,429
Patented July 31, 1962

3,047,429

MAGNETIC RECORDING MEDIUM COMPRISING COATINGS OF FERRITE PARTICLES OF THE MOLAR COMPOSITE aMnO.bZnO.cFe$_2$O$_3$

Arthur I. Stoller, New Brunswick, and Irwin Gordon, Princeton, N.J., assignors to Radio Corporation of America, a corporation of Delaware Filed Mar. 27, 1959, Ser. No. 802,448
13 Claims. (Cl. 117—169)

This application is a continuation-in-part of U.S. application Serial No. 734,763, filed May 12, 1958 by Arthur I. Stoller and Irwin Gordon, and is assigned to the same assignee, and now abandoned.

This invention relates to improved magnetic recording media and magnetic impulse record members comprising magnetic ferrite particles, and particularly, but not necessarily exclusively, to magnetic recording tapes.

Magnetic recording tapes have heretofore been made comprising a non-magnetic backing, such as paper or plastic, impregnated or coated with magnetic ferrite particles in a binder. By "ferrite" is meant materials having a spinel-type crystal structure and the general composition $A_a^{+\alpha}B_b^{+\beta} \ldots N_n^{+\gamma}O_4$, where A, B, . . . N are cations which are at least one in number; *a, b,* . . . *n* are respectively the number of atoms of cations A, B, . . . N per formula unit; and $\alpha$, $\beta$, . . . $\gamma$ are respectively the valences of cations A, B, . . . N; where one of the cations present in appreciable amounts is trivalent iron; where the sum $a+b+ \ldots n$ has a value between about 2⅔ and 3; and where the sum of $a\alpha+b\beta+ \ldots n\gamma$ is about 8. Such previous ferrite magnetic recording tapes have not been entirely satisfactory because the remanent magnetization thereof is low and because the coercive force thereof is high and substantially invariant.

As a result, the ferrite magnetic tapes have been replaced with similar tapes wherein oriented elongated particles of gamma ferric oxide ($\gamma$-$Fe_2O_3$) or ferrosoferric oxide ($Fe_3O_4$) are substituted for the previous ferrite particles. Such iron oxide magnetic tapes, while satisfactory for some purposes, are limited in the coercive force, magnetic moment and remanent magnetization, limiting the applications for which the recording tapes may be designed. The ferrosoferric oxide is undesirable because its coercive force at room temperature is relatively high, requiring relatively high recording and erase signals. The gamma ferric oxide has a desirable coercive force but exhibits a relatively low magnetic moment, yielding relatively low output signals upon playback. Furthermore, the special elongated gamma iron oxide particles which are used are relatively expensive.

An object of this invention is to provide improved magnetic recording media comprising magnetic ferrite particles.

Another object is to provide improved magnetic recording tapes.

Another object is to provide magnetic materials especially adapted for use in magnetic impulse record members and to provide improved processes of preparation thereof.

In general, the magnetic recording media herein comprises a support, such as a tape, disc, or drum, and a magnetic coating on at least a portion of the surface of said support. The magnetic coatings herein comprise ferrite particles either elongated or non-elongated in a solid binder; said ferrite having the molar composition calculated as the following oxides:

$$a\text{MnO}.b\text{ZnO}.c\text{Fe}_2\text{O}_3$$

wherein $a$=0.0 to 0.50
$b$=0.0 to 0.30
$c$=0.45 to 0.99, and
$a+b+c=1.00$

Additions to the foregoing ferrites of up to 10 weight percent of cobalt oxide result in further improvements to the characteristics of the recording media herein.

The magnetic recording tapes herein have the advantage over previous ferrite magnetic recording tapes in that higher values of remanent magnetization are obtainable, and that the coercive force may be varied over a wide range. The magnetic recording tapes herein have the advantage over previous iron oxide recording tapes in that the magnetization and coercive force may be varied by variations in composition, and in that cheaper and more easily synthesized magnetic materials are used.

This continuation-in-part application extends the compositional range disclosed in the parent application to 0.99 mol fraction $Fe_2O_3$. Further this continuation-in-part application provides a novel and improved elongated form of the ferrite particles herein with novel and improved processes for synthesis thereof. By elongated is meant that the length-to-width ratio of the individual particles is 2.0 to 1.0 and greater. By virtue of the elongation the magnetic anisotropy of the individual particles is intensified, the particles tend to orient themselves in a common direction and, with the application of an orienting field, the orientation may be conveniently optimized in the direction of travel of the recording head.

The invention is described in more detail in the following description read in conjunction with the drawings in which.

Figures 1, 2, 4, 5:
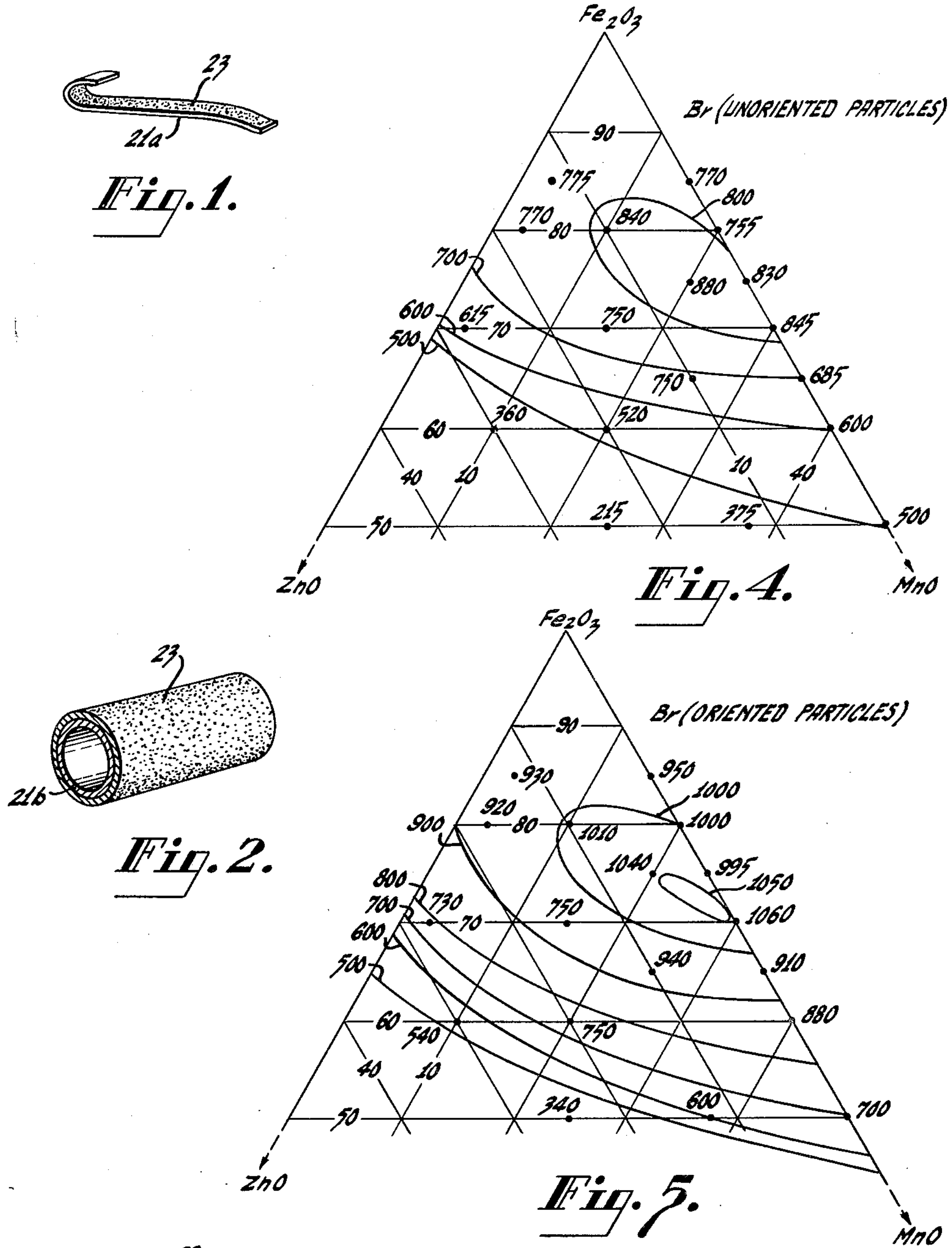
FIGURE 1 is a magnetic recording tape according to the invention.
FIGURE 2 is a magnetic recording drum according to the invention.
Figure 6:
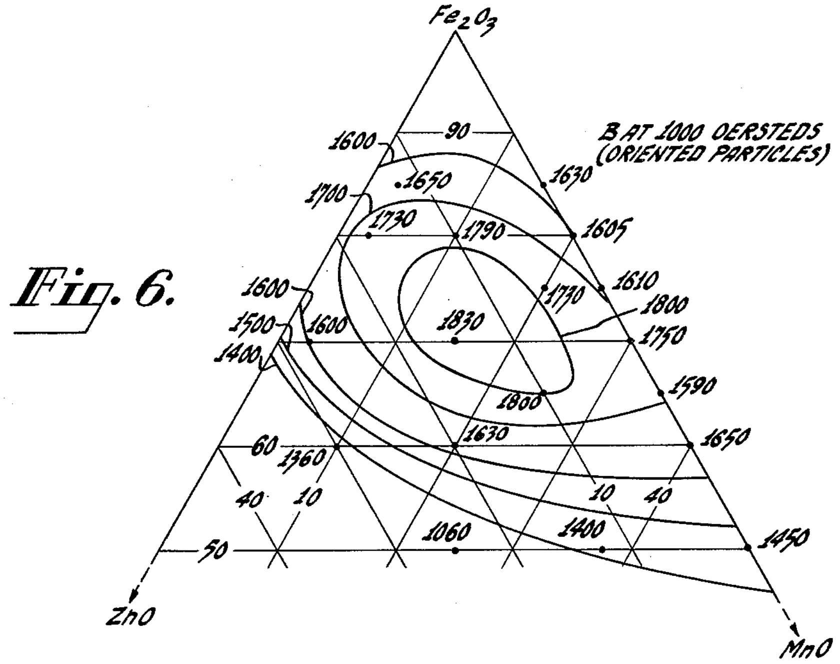

FIGURE 4 is a triaxial diagram illustrating the values of remanent magnetization of magnetic tapes herein, wherein the non-elongated ferrite particles have not been oriented, FIGURE 5 is a triaxial diagram illustrating the values of remnant magnetization of magnetic tapes herein, wherein the non-elongated ferrite particles have been oriented with a magnetic field during the preparation thereof, FIGURE 6 is a triaxial diagram illustrating the values of magnetization at about 1000 oersteds of the recording tapes of FIGURE 5.

Figure 7:
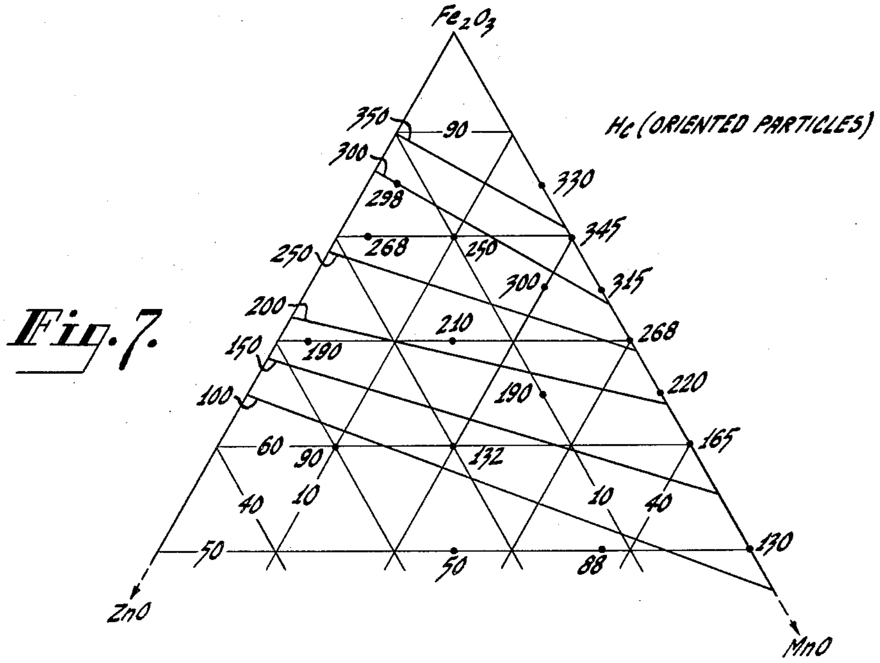

FIGURE 7 is a triaxial diagram illustrating the values of coercive force of the recording tape of FIGURE 5.

EXAMPLE 1

The following specific example is given to aid in the description of the invention. To prepare preferred non-elongated ferrite particles, weigh 83.0 g. of C.P. grade $Fe_2O_3$ and 17.0 g. of C.P. $Mn_3O_4$ into one liter steel ball mill half full of ⅜" steel balls. Add 100 cc. of methyl alcohol. Mix for 4 hours and then empty the slurry into a pan and dry it. Mixing may be accomplished by ball milling, tumbling, chemical precipitation, or any other suitable chemical or mechanical means. Screen the dried powder through a 20 mesh screen and put it into a ceramic boat. Place the ceramic boat in a gas-tight muffle furnace and pass $N_2$ thru the muffle at the rate of about 0.5 liter per minute and maintain this flow throughout the entire firing cycle. Heat the furnace at the rate of 150° C./hr. to a temperature of 1300° C. for 1½ hours. The firing temperature may be varied between 1000 and 1500° C. Likewise the firing time and atmosphere are not critical, but may be optimized according to the batch composition and the desired magnetic characteristics. Cool the furnace at the rate of 150° C./hr. to room temperature. Remove the ferrite from the ceramic boat and put it into a one liter steel ball mill half full of ⅜" steel balls, add 100 cc. of methyl alcohol, and grind for 20 hours to a particle size of 0.1 to 2.0 microns. Empty the ball mill and dry the ferrite powder. Substantially, all of the raw batch is reacted resulting in a manganous ferrous ferrite whose composition may be calculated from the raw batch as $0.3 \cdot MnO \cdot 0.7 \cdot Fe_2O_3$ or as $$Mn^{+2}_{.53} \cdot Fe^{+2}_{.47} \cdot Fe_2O_4$$

To make a magnetic tape according to the invention, weigh the following composition into a ⅓ liter ball mill half full of ⅜" steel balls:

25 grams of ferric powder.
0.4 gram lithium stearate.
0.5 gram lead carbonate.

50 grams of a cellulose acetate binder solution. The mixture is milled for about an hour, vented, and then milled for an additional 34 hours. The mixture is now ready for coating.

A flexible, non-magnetic tape about 0.0015 inch thick and about 0.250 inch wide, as of cellulose acetate is provided. The milled composition is coated on one of the tape surfaces and dried to provide a finished coating about 0.0005 inch thick. One preferred method for coating is to place the milled composition in a reservoir above a knife edge wiper. The tape is pulled under the wiper at a rate of speed and under sufficient pressure to provide the desired coating thickness.

While the coating is wet, it is preferably run through a D.C. solenoid which provides an orienting magnetic field of about 1000 oersteds parallel to the plane of the tape and the direction of travel of the tape. Such high magnetic fields orient the ferrite particles to provide higher effective remanence (Br) and a higher effective ratio of remanence to saturation magnetization ($Br/Bs$) in the finished tape.

The coated tape, with or without orientation is allowed to dry in air, or may be force dried with the aid of heat and air circulated about the tape.

A typical magnetic recording tape is illustrated in FIGURE 1 comprising a cellulose acetate support 21a 0.250 inch wide and 0.0015 inch thick. The support 21a is coated on one surface thereof with a mixture comprising particles of ferrite in a cellulose acetate binder.

The characteristics of a recording tape according to the foregoing example wherein the ferrite particles are oriented is as follows:

Remanent magnetization (Br)=1060 gauss.
Coercive force (Hc)=268 oersteds.
Magnetization at 1000 oersteds ($B_{1000}$)=1750 gauss.

Figure 3:
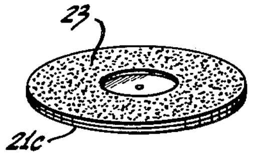
FIGURE 3 is a magnetic recording disc according to the invention.

The foregoing specific example may be varied to vary the characteristics thereof. The support may be a flexible tape as shown in FIG. 1, or a drum coated on the outer surface thereof as shown in FIG. 2, or a disc coated on one surface thereof as shown in FIG. 3. The preferred support is the flexible tape shown in FIG. 1. The support may be any magnetic or non-magnetic material such as iron, alloys, cellulose acetate, mylar, nylon, paper, glass, ceramic, or cloth. Where the support is a tape it is preferably flexible. Where the support is a drum or disc as shown in FIGS. 2 or 3, it is preferably rigid. The binder for the ferrite particles may be magnetic or non-magnetic and may be selected from a very large group of binders. Examples of suitable binders are cellulose acetate, polyvinyl acetate, sodium silicate, gum arabic, casein, glass, or low-melting metals. Where the support is flexible, the binder should also be flexible.

All the magnetic materials herein are essentially single phase solid solutions of ferrites having a spinel-type crystal structure. They may be zinc-ferrous ferrites, manganous-ferrous ferrites, zinc-manganous-ferrous-ferrites, manganous-zinc ferrites or zinc-manganous-manganic-ferrite.

The selection of the ferrite is critical and should be selected from the following range of ferrite compositions calculated as the following oxides:

$$a\text{MnO}.b\text{ZnO}.c\text{Fe}_2\text{O}_3$$

wherein:

$a$=0.00 to 0.50
$b$=0.00 to 0.30
$c$=0.45 to 0.99, and
$a+b+c=1.00$

It will be understood that the above compositional representation is to aid in understanding and identifying the ferrites herein. The cation content has been converted to the designated oxides for this purpose. Actually, the ferrite compositions are adjusted in oxygen content and the cations adjusted in valence to provide the improved ferrites herein. Further, the materials herein include stoichiometric ferrite compositions and various defect compositions having the spinel structure and other ferrite characteristics. The compositions with a generally high value of remanent magnetization (Br) and a coercive force (Hc) in the range generally desired for recording tapes are in the range of compositions wherein:

$a$=0.05 to 0.50
$b$=0.00 to 0.20, and
$c$=0.65 to 0.85

The preferred compositions for magnetic recording tapes fall within the range wherein:

$a$=0.10 to 0.30
$b$=0.0 to 0.10, and
$c$=0.70 to 0.80

FIGURES 4, 5, 6 and 7 provide data of various characteristics for magnetic recording tapes prepared with non-acicular ferrite particles within the foregoing ranges. FIG. 4 defines the value of remanent magnetization for ferrite tapes prepared with unoriented ferrite particles of various compositions. It will be noted that the highest value attained is for the composition $$0.20MnO \cdot 0.05ZnO \cdot 0.75Fe_2O_3$$

which is approximately 880 gauss.

FIGURE 5 gives the remanent magnetization for ferrite recording tapes prepared with oriented non-acicular ferrite particles of various compositions. It will be noted that the value of remanent magnetization for the above-mentioned composition increases from 880 to 1040 gauss as a result of orientation. The highest value of remanent magnetization attained is 1060 gauss for the composition $0.30MnO \cdot 0.70Fe_2O_3$.

There are two mechanisms by which the orientation of non-acicular particles improves the remanent magnetization. By the first mechanism, the particles line up in strings parallel to the orienting field. Thus, when the tape is magnetized these strings act as longer magnets than the individual particles. This results in less of a demagnetizing effect in the system. Also, a greater output is obtained when playing back on a tape wherein the ferrite particles are oriented. This is because the strings provide a lower reluctance flux path than particles randomly situated in the binder, without the necessity for increasing the ratio of magnetic material to binder. Such an increase would make the coating physically inferior. The orientation herein is not to be confused with the orientation of acicular particles, as in iron oxide tapes, wherein the benefit is derived from the shape anisotropy of the particles.

By the second mechanism by which orienting improves the remanent magnetization, the non-elongated particles rotate so that the easy direction of magnetization lies more parallel to the plane of the tape and to the direction of the flux.

FIGURE 6 gives the magnetization of recording tapes prepared with oriented non-elongated ferrite particles of various compositions in a magnetizing field of about 1000 oersteds. The highest value attained is about 1830 gauss for the composition $0.15MnO \cdot 0.15ZnO \cdot 0.70Fe_2O_3$.

FIGURE 7 gives the coercive force for recording tapes prepared with oriented non-elongated ferrite particles of various compositions. It will be noted generally that the coercive force increases with increasing proportions of $Fe_2O_3$ and decreases with increasing proportions of ZnO.

The significance of the foregoing data in FIGS. 4 to 7 is as follows. The value of remanent magnetization (Br) is indicative of the strength of the signal remaining on the tape following recording. The higher the value of Br, the more output the tape has for a given recording signal.

The value of magnetization at 1000 oersteds ($B_{1000}$) as shown in FIG. 6 is a measure of the attainable remanence under ideal conditions.

The value of coercive force (Hc) as shown in FIG. 7 is a measure of the ease with which one may record or erase a signal on the tape. Where a recording is for permanent record and erasure is not desired, high values of coercive force are desired. Where a signal is to be recorded temporarily and later erased and another signal recorded, a lower value of coercive force is preferred.

However, if the coercive force is too low, a section of tape may be partially magnetized by the magnetic field of an adjacent layer of recorded tape on a tightly wound reel. This is known as "print through." Also, if the coercive force is too low, the tape is more vulnerable to being fully or partially erased by strong magnetic fields. Thus, it is desirable to adjust the value of coercive force according to the use to which the tape is being put. This may be accomplished by compositional adjustment according to the invention.

Table I lists various non-elongated ferrite particle compositions prepared as described in the example by firing oxide mixtures at about 1300° C. for about two and one-half hours in nitrogen and gives properties of tapes utilizing these compositions. The elongated gamma iron oxide particles are a commercially supplied material. It will be noted that the ferrite tapes made in accordance with the present invention have considerably better properties than other ferrite tapes listed in Table I, and that the characteristics of the ferrite tapes herein compare favorably with the characteristics of the iron oxide tapes.

Further improvements to the non-elongated ferrite particle tapes herein may be attained by compositional adjustment. Specifically, it has been found that addition of up to 10 weight percent of cobalt oxide to the ferrite composition herein results in a further increase in remanent magnetization and coercive force. Table II lists the characteristics of recording tapes prepared with oriented non-elongated ferrite particles of the composition of $0.20MnO \cdot 0.05ZnO \cdot 0.75Fe_2O_3$ with various additions of $Co_2O_3$ up to 3 weight percent. All of the compositions were fired at about 1300° C. for about one and one-half hours in an atmosphere of nitrogen.

In preparing any of the ferrite particles herein, the selected materials may be any which will introduce oxides into the composition during the firing step. The starting materials may be oxides, carbonates, oxalates or any other materials which will produce oxides when heated under suitable conditions.

*Table I*

COMPARISON OF ORIENTED NON-ELONGATED FERRITE RECORDING TAPES

| Compositions [1] | Br | Hc | B(at 1000 Oer.) |
|---|---|---|---|
| $.70Fe_2O_2 \cdot .30MnO$ | 1,060 | 268 | 1,750 |
| $.75Fe_2O_2 \cdot .25MnO$ | 995 | 315 | 1,160 |
| Gamma $Fe_2O_3$(acicular) | 1,080 | 280 | 1,435 |
| $.75Fe_2O_3 \cdot .25MgO$ | 680 | 335 | 1,160 |
| $.75Fe_2O_3 \cdot .10MnO \cdot .15MgO$ | 790 | 300 | 1,350 |
| $.75Fe_2O_3 \cdot .20MnO \cdot .05MgO$ | 905 | 320 | 1,470 |
| $.75Fe_2O_3 \cdot .15Li_2O \cdot .10MgO$ | 600 | 233 | 1,145 |
| $.75Fe_2O_3 \cdot .05Li_2O \cdot .20MgO$ | 700 | 260 | 1,270 |
| $.75Fe_2O_3 \cdot .15Li_2O \cdot .10MnO$ | 640 | 210 | 1,235 |
| $.75Fe_2O_3 \cdot .05Li_2O \cdot .20MnO$ | 850 | 265 | 1,440 |
| $.75Fe_2O_3 \cdot .15Li_2O \cdot .10CoO$ | 405 | 495 | 900 |

[1] All non-elongated except as noted.

*Table II*

NON-ELONGATED $0.75Fe_2O_3 \cdot 0.05ZnO \cdot 0.20MnO$ WITH $Co_2O_3$ ADDITIONS

| Percent $Co_2O_3$ | Br | Hc | B(at 1000 gauss) |
|---|---|---|---|
| 0 | 975 | 270 | 1,710 |
| .3 | 980 | 280 | 1,700 |
| .8 | 1,000 | 295 | 1,700 |
| 1.5 | 930 | 335 | 1,520 |
| 3.0 | 1,020 | 425 | 1,620 |

Still further improvements to the magnetic properties of the ferrite compositions herein are achieved by producing the particles thereof in elongated form. Elongated particles tend to orient themselves in a common direction during fabrication of recording elements. If, in addition, an orienting magnetic field is applied during fabrication of recording elements with elongated ferrite particles, then still further improvements are achieved in the characteristics of the tape.

The general procedure for producing elongated ferrite particles herein is to provide elongated iron oxide particles and then to diffuse ZnO and/or MnO into the particles, react the diffused oxide with the iron oxide and to develop the spinel-type cubic crystal structure without destruction of the elongation of the particles.

Elongated iron oxide particles are known in the chemical art. They are sometimes called acicular iron oxides, though they need not necessarily be needle-shaped. Some are hydrous and some are substantially free of combined water; some are magnetic and some are non-magnetic; some contain the iron entirely in the trivalent state and in others, a portion of the iron oxide is in other valence states. Two suitable elongated iron oxides are referred to in the art as alpha iron oxide, $\alpha$-$Fe_2O_3$, and hydrated alpha iron oxide $\alpha$-$Fe_2O_3 \cdot H_2O$. Particles of both materials are non-magnetic and may be provided with a length-to-width ratio of about 6 to 1. Suitable elongated $Fe_2O_3 \cdot H_2O$ particles may be prepared as follows. React 3 grams NaOH in 10 grams water with 12 grams $FeSO_4 \cdot 7H_2O$ in 60 grams water with agitation and exposure to air for an extended period. This produces colloidal $Fe_2O_3 \cdot H_2O$ which will serve as crystal nuclei. In a separate vessel mix 175 grams $Fe_2O_3 \cdot 7H_2O$ in 3.5 liters water and 1 kilogram of scrap iron. Heat to 60° C., add the colloidal $Fe_2O_3 \cdot H_2O$, bubble air through the solution holding at 60° C. for about 4 hours. Filter off, wash and dry the elongated particles of elongated $$Fe_2O_3 \cdot H_2O$$

The particle size is about 0.1 to 0.3 micron wide and .3 to 1.5 microns long.

The length-to-width ratio of the starting iron oxide particles used in the raw batch of applicant's processes is of considerable importance. This ratio must be at least as high as the ratio desired for the final product. Thus, for the magnetic recording media herein, the desired ratio is 2.0 to 1.0 and greater; and, the ratio for the iron oxide particles used in the raw batch should be 2.0 to 1.0 and greater also. It has been found that products with a length-to-width ratio as low as 1.1 to 1.0 provide an improvement over the non-acicular product. However, the preferred products have a length-to-width ratio of 2.0 to 1.0 and greater. The elongated ferrite particles herein may be acicular; i.e., needle-shaped. However, they are generally flat-sided and blunt ended particles. The term "elongated" is intended to include "acicular."

The diffusion and recrystallization steps of applicant's processes are carried out at elevated temperatures by solid state reaction. The acicular iron oxide particles are intimately mixed with zinc oxide and/or manganese oxide particles. The zinc oxide and manganese oxide particles may be in hydrous or anhydrous form, and may be in the form of heat decomposable compounds such as carbonates, acetates, oxalates, hydrovides, etc.

The mixture is heated at a temperature high enough to cause diffusion of cations, and reaction and recrystallization of the constituents; but not so high as to destroy the elongated character of the particles. Temperatures between 300 and 1000° C. have been found to be suitable. The atmosphere during firing is adjusted to provide the required oxidation state for iron and manganese.

In synthesizing the elongated ferrites by diffusion, the constituents are usually not completely reacted. As a consequence, following synthesis the reaction product is treated to remove the unreacted part. This may be accomplished with a dilute acid such as hydrochloric acid. Further, the composition of the product is not calculated from the raw batch, but is obtained by chemical and crystallographic analysis. Such analysis consistently shows the formation of mixed crystal ferrites within the claimed ranges and having an elongated particle shape with a length-to-width ratio of 2.0 and 1.0 and greater.

EXAMPLE 2

To prepare elongated ferrite particles having the molar composition $0.08ZnO \cdot 0.92Fe_2O_3$ proceed as follows. Mix the following materials for 2½ hours in a steel ball mill (1 litre), half full of ⅜" steel balls:

80.9 g.—Mapico acicular hydrated alpha $Fe_2O_3$
18.5 g.—$ZnCO_3$
200 cc.—Methanol Dry in oven at 100° C. Screen through a 20 mesh screen. Place the powder in a stainless steel boat and put it into a controlled atmosphere furnace. Heat the furnace to 275° C. for 3 hours in a hydrogen atmosphere to convert the $Fe_2O_3$ to $Fe_3O_4$. Change the atmosphere to $N_2$ and heat to 500° C. for 10 hours and then cool. Fill the furnace with water before removing the material to prevent oxidation. Remove the material from the furnace and rinse it 2 times in HCl to dissolve any unreacted ZnO, MnO and any FeO that is formed as a reaction product. An improved magnetic tape of the invention may be prepared as described under Example 1, by mixing with a binder, coating on a support, orienting the particles and then solidifying the binder. Table III compares the tapes made with the elongated ferrite particles herein with tapes made with prior elongated iron oxide particles.

*Table III*

COMPARISON OF ORIENTED ELONGATED PARTICLE RECORDING TAPES

| Composition [1] | $\mu_B$ | Hc | $B'_{1000}$ | Br | Signal /Noise, db | Output drop at 15 kc., db | Output, db |
|---|---|---|---|---|---|---|---|
| $.08ZnO \cdot .92Fe_2O_3$ | 4.3 | 265 | 1,980 | 1,480 | 65 | −3 | 43 |
| Same (nonelongated) | 4.0 | 268 | 1,680 | 920 | 45 | −10 | 42 |
| Gamma-$Fe_2O_3$ | 3.0 | 268 | 1,440 | 1,070 | 60 | 0 | 41 |

[1] All elongated except as noted.

What is claimed is:

1. A magnetic recording medium comprising a support and a magnetic coating on said support; said coating comprising ferrite particles in a binder; said ferrite particles having a spinel type crystal structure and the molar composition:

$$aMnO.bZnO.cFe_2O_3$$

wherein:

$a$=0.0 to 0.50
$b$=0.0 to 0.30
$c$=0.55 to 0.85, and
$a+b+c=1.0$

2. A magnetic recording medium comprising a support and a magnetic coating on said support; said coating comprising ferrite particles in a binder; said ferrite particles being less than 2.0 microns in their greatest dimension and havng a spinel type crystal structure and the molar composition:

$$aMnO.bZnO.cFe_2O_3$$

wherein:

$a$=.05 to .35
$b$=0.0 to 0.20
$c$=.65 to .85
$a+b+c=1.0$

3. A magnetic recording tape comprising a flexible support and a flexible magnetic coating thereon; said coating comprising magnetically-oriented, ferrite particles in a binder; said ferrite particles having a spinel-type crystal structure and the molar composition:

$$aMnO.bZnO.cFe_2O_3$$

wherein:

$a$=0.10 to 0.30
$b$=0.0 to .10
$c$=0.70 to 0.80
$a+b+c=1.0$

4. A magnetic material adapted for use in a magnetic impulse record member consisting essentially of small elongated ferrite particles having a length-to-width ratio of 2.0 to 1.0 and higher and a spinel type crystal structure and being less than 2.0 microns in their greatest dimension, said particles consisting essentially of chemically combined oxides in the following molar proportions calculated as the following oxides:

| | |
|---|---|
| MnO | 0.05 to 0.35 |
| ZnO | 0.00 to 0.20 |
| $Fe_2O_3$ | 0.65 to 0.85 |

the sum of the proportions of manganese oxide, zinc oxide plus iron oxide being equal to 1.00.

5. A magnetic material adapted to form an element of a magnetic impulse record member, said material consisting essentially of small elongated particles having characteristically in their as produced condition a length-to-width ratio of about 2.0 to 1.0 and higher and being less than 2.0 microns in their greatest dimension, said crystals consisting essentially of a synthetic ferrite having a spinel type crystal structure and the molar composition calculated as the following oxides:

$$a\text{MnO}.b\text{ZnO}.c\text{Fe}_2\text{O}_3$$

wherein:

$a$=0.00 to 0.50
$b$=0.00 to 0.30
$c$=0.45 to 0.99, and
$a+b+c$=1.00

6. The material of claim 5 wherein the molar composition is:

$$0.08\text{ZnO}\cdot 0.92\text{Fe}_2\text{O}_3$$

7. A magnetic impulse record member comprising a support and a magnetic layer on a surface thereof said layer comprising a particulate magnetic material in a solid film-forming binder, said material consisting essentially of small elongated ferrite particles having a spinel type crystal structure, a length-to-width ratio of about 2.0 to 1.0 and higher, and being less than 2.0 microns in their greatest dimension, said particles consisting essentially of chemically combined oxides in the following molar proportions calculated as the following oxides:

| | |
|---|---|
| Manganese oxide | 0.00 to 0.50 |
| Zinc oxide | 0.00 to 0.30 |
| Ferric oxide | 0.45 to 0.99 |

the sum of the proportions of manganese oxide, zinc oxide plus iron oxide being equal to 1.00.

8. A magnetic impulse record member comprising a support and a layer thereon comprising a particulate magnetic material in a solid, film-forming binder, said magnetic material consisting essentially of small elongated particles having characteristically in their as-produced condition a length-to-width ratio of about 2.0 to 1.0 and higher and being less than 2.0 microns in their greatest dimension, of a synthetic ferrite having a spinel type crystal structure and the molar composition calculated as the following oxides:

$$a\text{MnO}.b\text{ZnO}.c\text{Fe}_2\text{O}_3$$

wherein:

$a$=0.05 to 0.35
$b$=0.00 to 0.20
$c$=0.65 to 0.85, and
$a+b+c$=1.00

9. A method for preparing elongated magnetic ferrite particles comprising intimately mixing in the following molar proportions:

| | |
|---|---|
| Manganese as a compound thereof | 0.00 to 0.50 |
| Zinc as a compound thereof | 0.00 to 0.30 |
| Elongated iron oxide particles | 0.45 to 0.99 |

the total proportion of manganese oxide plus zinc oxide plus iron oxide being equal to 1.00; said elongated iron oxide particles having a length-to-width ratio greater than 2.0 to 1.0, heating said mixture at elevated temperatures between 300 and 1000° C. and for periods sufficient to diffuse said manganese and said zinc into said iron oxide but insufficient to reduce the length-to-width ratio of said iron oxide particles below 2.0 to 1.0, and then cooling said mixture without oxidation thereof.

10. A method for preparing elongated magnetic ferrite particles comprising intimately mixing in the following molar proportions:

| | |
|---|---|
| Manganese, as an oxide thereof | 0.00 to 0.50 |
| Zinc, as an oxide thereof | 0.00 to 0.30 |
| Elongated ferric oxide particles | 0.45 to 0.99 |

the total proportion of manganese oxide plus zinc oxide and ferric oxide being equal to 1.00; said elongated iron oxide particles having a length-to-width ratio greater than 2.0 to 1.0, heating said mixture in a reducing atmosphere at temperatures between 200 and 400° C., further heating said mixture in a neutral atmosphere at temperatures between 400 and 600° C., and then cooling said mixture without oxidation thereof.

11. The process of claim 10 including treating the cooled mixture with dilute hydrochloric acid, and then drying the remaining particles.

12. A method for preparing elongated magnetic ferrite particles consisting essentially of intimately mixing in the following weight proportions:

80.9 grams acicular hydrated alpha $\text{Fe}_2\text{O}_3$ particles about 0.1 to 0.3 micron wide and 0.3 to 1.5 microns long and having a length-to-width ratio greater than 2.0
18.5 grams $\text{ZnCO}_3$ heating said mixture in a hydrogen atmosphere at temperatures between 250 and 300° C., further heating said mixture in a nitrogen atmosphere at temperatures between 475 and 525° C., cooling the mixture without oxidation thereof, and then treating the cooled mixture with dilute hydrochloric acid, and then drying the remaining particles.

13. A magnetic recording medium comprising a support and a magnetic coating on said support; said coating comprising ferrite particles in a binder; said ferrite particles having a spinel type crystal structure and consisting essentially of the molar composition:

$$a\text{MnO}.b\text{ZnO}.c\text{Fe}_2\text{O}_3$$

wherein:

$a$=0.0 to 0.50
$b$=0.0 to 0.30
$c$=0.55 to 0.85, and
$a+b+c$=1.0 and up to 10 weight percent cobalt oxide.

References Cited in the file of this patent

UNITED STATES PATENTS

| | | |
|---|---|---|
| 2,535,025 | Albers-Schoenberg | Dec. 26, 1950 |
| 2,594,893 | Faus | Apr. 29, 1952 |
| 2,734,034 | Crowley | Feb. 7, 1956 |
| 2,764,552 | Buckley et al. | Sept. 25, 1956 |
| 2,770,523 | Toole | Nov. 13, 1956 |

FOREIGN PATENTS

| | | |
|---|---|---|
| 683,722 | Great Britain | Dec. 3, 1952 |
| 721,630 | Great Britain | Jan. 12, 1955 |
| 726,462 | Great Britain | Mar. 16, 1955 |
| 729,538 | Great Britain | May 4, 1955 |

OTHER REFERENCES

Stoller: RCA TN No. 92, Dec. 2, 1957.
Haynes: Elements of Magnetic Recording, page 72, Prentice-Hall, N. J., 1957.